(12) United States Patent
Yang (10) Patent No.: US 9,846,324 B2
(45) Date of Patent: Dec. 19, 2017

(54) DISPLAY DEVICE AND METHOD FOR FABRICATING THE SAME

(71) Applicant: Samsung Electronics Co., Ltd., Suwon-si, Gyeonggi-do (KR)

(72) Inventor: Hae-Jung Yang, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 14/308,137

(22) Filed: Jun. 18, 2014

(65) Prior Publication Data

US 2015/0198832 A1 Jul. 16, 2015

(30) Foreign Application Priority Data

Jan. 10, 2014 (KR) .................. 10-2014-0003630

(51) Int. Cl.
*G02F 1/1333* (2006.01)
*G06F 3/044* (2006.01)
*G02F 1/1334* (2006.01)

(52) U.S. Cl.
CPC ........ *G02F 1/13338* (2013.01); *G02F 1/1334* (2013.01); *G06F 3/044* (2013.01); *G02F 2201/44* (2013.01); *G06F 2203/04103* (2013.01); *G06F 2203/04111* (2013.01)

(58) Field of Classification Search
CPC .................................................. G02F 1/13338
See application file for complete search history.

(56) References Cited

U.S. PATENT DOCUMENTS

| 6,842,170 | B1 | 1/2005 | Akins et al. | |
|---|---|---|---|---|
| 2003/0071796 | A1 | 4/2003 | Nakanishi et al. | |
| 2011/0109566 | A1* | 5/2011 | Meng | G06F 3/044 345/173 |
| 2012/0256895 | A1* | 10/2012 | Azumada | G09G 3/36 345/211 |
| 2013/0147740 | A1* | 6/2013 | Wang | G06F 3/041 345/173 |
| 2014/0007417 | A1* | 1/2014 | Li | G06F 3/044 29/622 |
| 2015/0185518 | A1* | 7/2015 | Igarashi | G02F 1/1334 349/12 |

FOREIGN PATENT DOCUMENTS

| JP | 2000-172437 A | 6/2000 |
|---|---|---|
| JP | 2000-310949 A | 11/2000 |
| JP | 2003-114764 A | 4/2003 |
| KR | 10-2013-0062747 A | 6/2013 |

OTHER PUBLICATIONS

G.Spruce and R. D. Pringle—"Polymer dispersed liquid crystal films", Apr. 1992.

* cited by examiner

*Primary Examiner* — Edmond Lau
(74) *Attorney, Agent, or Firm* — Jefferson IP Law, LLP (57) ABSTRACT

A display device and a method for fabricating the display device are provided. The display device includes a transparent circuit substrate for use as a touch screen, the transparent circuit substrate includes a transparent substrate, a Polymer Dispersed Liquid Crystal (PDLC) coating layer formed on the transparent substrate, an electrode layer provided on the PDLC coating layer, for applying current to the PDLC coating layer, and an insulation layer provided on the electrode layer.

9 Claims, 7 Drawing Sheets

DISPLAY DEVICE AND METHOD FOR FABRICATING THE SAME

CROSS REFERENCE RELATED TO APPLICATION(S)

This application claims the benefit under 35 U.S.C. §119(a) of a Korean patent application filed on Jan. 10, 2014 in the Korean Intellectual Property Office and assigned Ser. No. 10-2014-0003630, the entire disclosure of which is hereby incorporated by reference.

TECHNICAL FIELD

The present disclosure relates to a display device and a method for fabricating the display device.

BACKGROUND

A display device typically refers to a device that outputs an image to a screen. Currently, touch screen devices are used as display devices, in which an input detection means, such as a touch panel, is integrated into the display means, such as a liquid display, so that an input is recognized by a touch on the screen, without the need for a physical keypad.

A display device includes a display unit such as a Liquid Crystal Display (LCD) and a touch panel disposed on the display unit. Touch panels are categorized into a resistive type, a capacitive type, a Surface Acoustic Wave (SAW) type, and an infrared type.

For the display device, a transparent substrate is provided on the touch panel to protect the touch panel. The touch panel is fabricated directly with the transparent substrate. Thus, a screen of the display unit is displayed on the transparent substrate and the touch panel recognizes a touch on the transparent substrate.

The display device may be divided into a Display Area (DA) and a Bezel Area (BA). An input is applied to the DA by a touch or proximity of an input means, whereas a peripheral area of the touch panel is defined as the BA where connection lines or circuits of the touch panel are provided. With the display device in active state, the DA is kept transparent to allow light transmission so as to sense a touch and display a screen. If the display device is inactive, the DA is kept black. The BA is rendered in various colors such as white or gold and protects a circuit board and connection lines connecting the touch panel electrically to the circuit board along the periphery of the touch panel against outward exposure.

Accordingly, a shielding layer is provided to render various colors along the periphery of the transparent substrate, corresponding to the BA, before the touch panel is provided on the transparent substrate. The shielding layer may be formed by printing black ink or screen-printing an ink containing resin such as PolyEthylene (PE), acryl, PolyUrethane (PU), or the like.

As described before, the DA is kept as a transparent substrate to display a screen, whereas only the BA is colored to prevent outward exposure of internal components. That is, coloring is confined only to the BA, not the DA.

When the display device is deactivated, the DA is always black and the BA is displayed in a color printed along the periphery of the transparent substrate. Consequently, the design of the display device is restrictive.

In addition, the BA and the DA are distinguished from each other by the color of the BA irrespective of whether the display device is active or inactive. As a result, the display device is less uniform visually.

Accordingly, a display device for rendering a display area in various colors even when the display device is inactive, and a method for fabricating the display device is desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display device for rendering a display area in various colors even when the display device is inactive, and a method for fabricating the display device.

Another aspect of the present disclosure is to provide a display device for rendering a bezel area and a screen area in the same color and a method for fabricating the display device.

In accordance with an aspect of the present disclosure, a display device including a transparent circuit substrate for use as a touch screen is provided. The transparent circuit substrate includes a transparent substrate, a Polymer Dispersed Liquid Crystal (PDLC) coating layer formed on the transparent substrate, an electrode layer provided on the PDLC coating layer, for applying current to the PDLC coating layer, and an insulation layer provided on the electrode layer.

In accordance with another aspect of the present disclosure, a method for fabricating a display device is provided. The method includes forming a PDLC coating layer on a transparent substrate, and providing an electrode layer on the PDLC coating layer to apply current to the PDLC coating layer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, and/or value need not be achieved exactly, but that deviations or variations, including for example, tolerances, measurement error, measurement accuracy limitations and other factors known to those of skill in the art, may occur in amounts that do not preclude the effect the characteristic was intended to provide.

In accordance with various embodiments of the present disclosure, a display device includes a Polymer Dispersed Liquid Crystal (PDLC) coating layer between a transparent substrate and a touch panel so that the orientation of PDLCs may be changed by current flowing through the PDLC coating layer and thus a Display Area (DA) as well as a Bezel Area (BA) may be rendered colored. In other words, when the display device is in active state, the DA is rendered as a transparent window on the transparent substrate in order to display a screen, whereas when the display device is in inactive state, the DA may be rendered in the same color as or a different color from the BA.

Figure 1A:
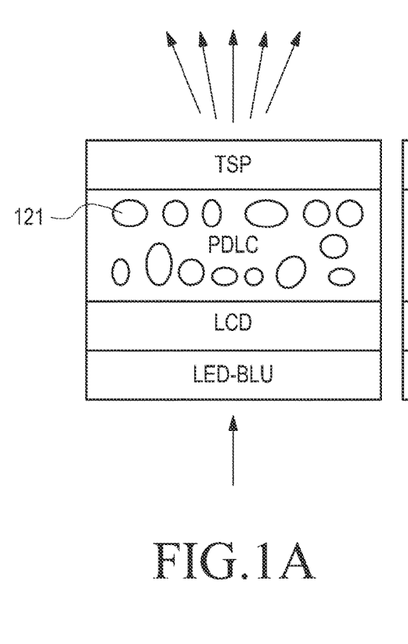
FIGS. 1A and 1B illustrate a display device according to an embodiment of the present disclosure.
Figure 1B:
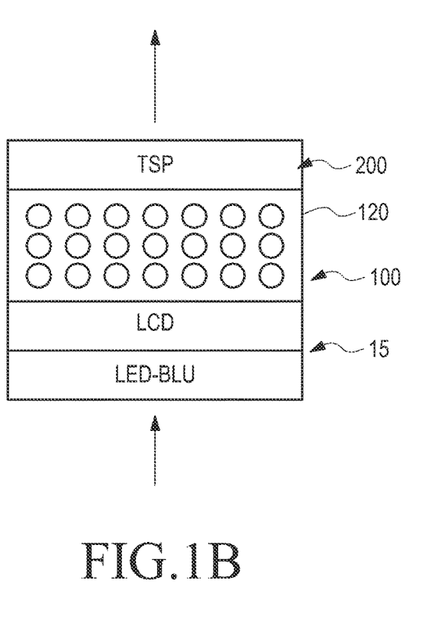
Figure 2:
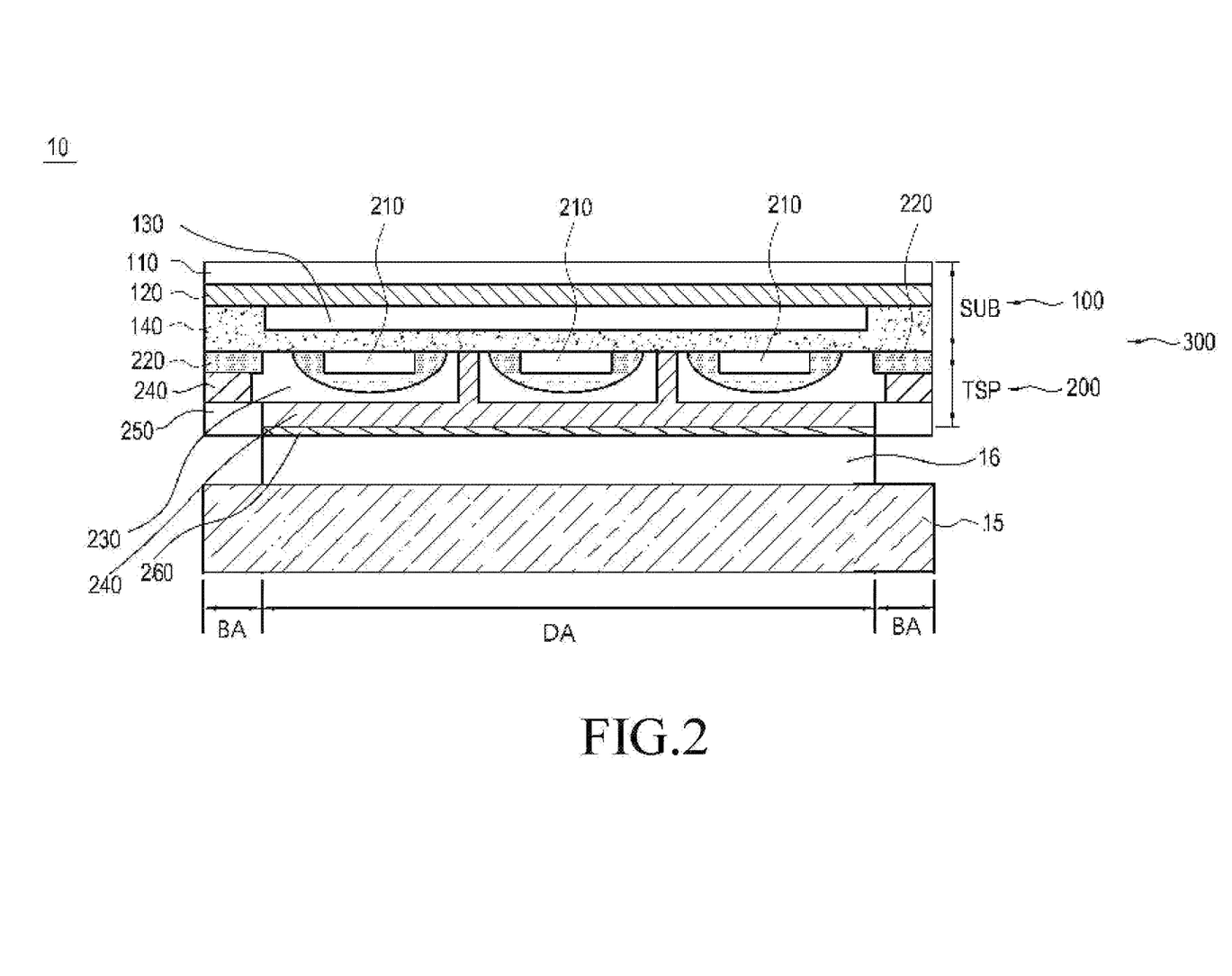
FIG. 2 is a sectional view of a display device according to an embodiment of the present disclosure.

FIGS. 1A and 1B illustrate a display device according to an embodiment of the present disclosure and FIG. 2 is a sectional view of a display device according to an embodiment of the present disclosure.

Referring to FIGS. 1A, 1B, and 2, a display device 10 may include a display unit 15, a transparent circuit substrate 300 for use as a touch screen, and an adhesive member 16 that combines the display unit 15 with the transparent circuit substrate 300. The display unit 15 is configured so as to provide an image to the transparent circuit substrate 300. The display unit 15 includes a number of pixels and displays an image using the pixels. A Liquid Crystal Display (LCD), an Organic Light Emitting Diode (OLED) display, or the like may be used for the display unit 15.

In an embodiment of the present disclosure, an LCD displays an image under the control of a controller (not shown). The LCD includes an LCD panel having a typical liquid crystal layer, for displaying an image, and a BackLight Unit (BLU) for projecting light to the LCD panel. The LCD panel includes the liquid crystal layer and upper and lower glass substrates that are provided on and under the liquid crystal layer, respectively, to control the molecular orientation of liquid crystals. The lower glass substrate includes thin-film transistors and pixel electrodes. The upper glass substrate includes common electrodes. The LCD panel further includes upper and lower polarization plates that are provided on and under the liquid crystal layer, respectively to linearly polarize incident light. The polarization directions of the upper and lower polarization plates are perpendicular to each other.

The transparent circuit substrate 300 is attached (or glued) to the display unit 15 by means of the adhesive member 16. A part (i.e., an insulating protection layer 260) of the bottom (i.e., the bottom surface) of the transparent circuit substrate 300 is attached onto the entirety of the top (i.e., the top surface) of the display unit 15. The adhesive member 16 is formed of an insulation material transparent to visible light. An Optical Clear Adhesive (OCA) tape, an adhesive (or a gluing agent), an UltraViolet (UV) curing resin, or the like which is transparent to visible light may be used as the adhesive member 16. The OCA tape is adhesive on both sides and may be formed of an acrylic material, silicon, or the like. The display device 10 may further includes a SUBstrate unit (SUB) 100, a transparent substrate 110, a Polymer Dispersed Liquid Crystal (PDLC) coating layer 120, an aqueous solution of PDLC 121, an electrode layer 130, an insulation layer 140, a Touch Screen Panel (TSP) 200, a conductive bridge layer 210, a first insulation layer 220, a sensor pattern 230, second insulation layer 240, and a connection pattern 250. The aqueous solution of PDLC 121 is spread on the surface of the transparent substrate 110.

Figure 3:
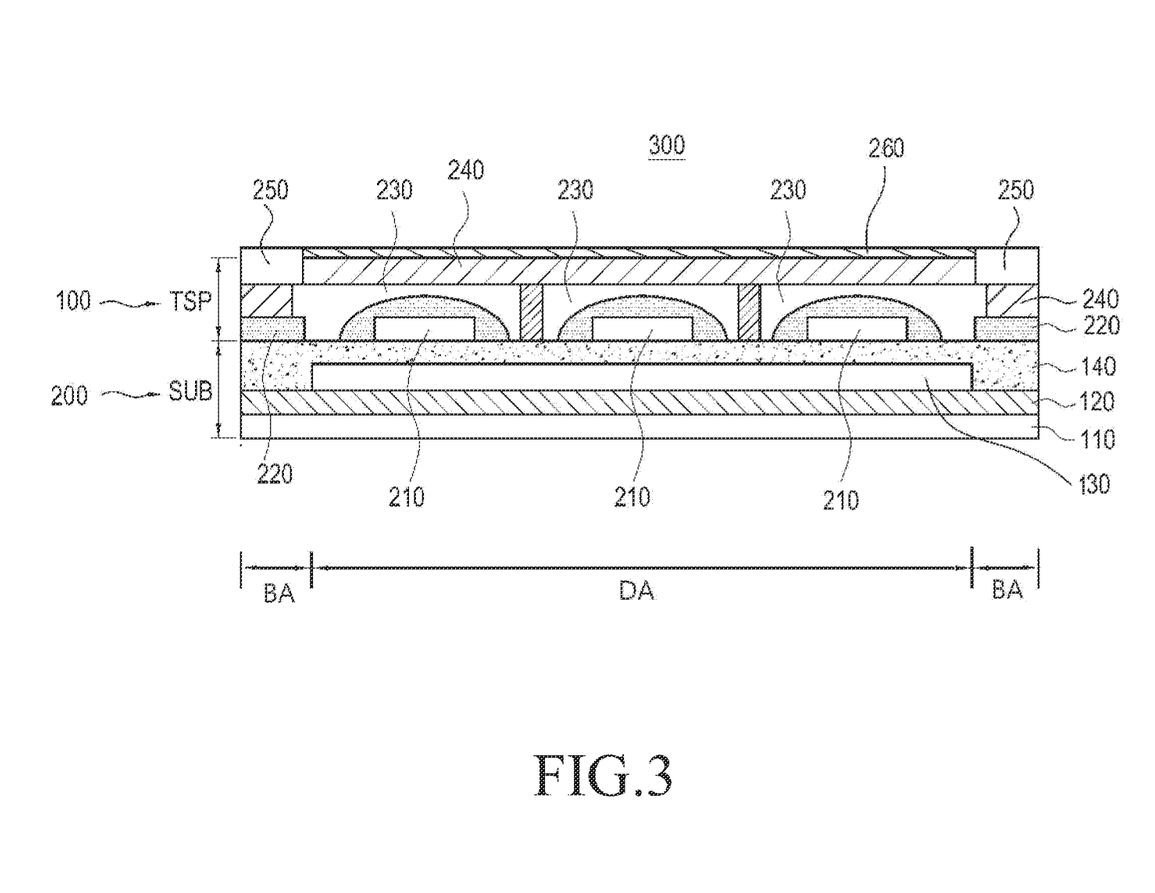
FIG. 3 is a sectional view of a transparent circuit substrate in a display device according to an embodiment of the present disclosure.
Figure 4:
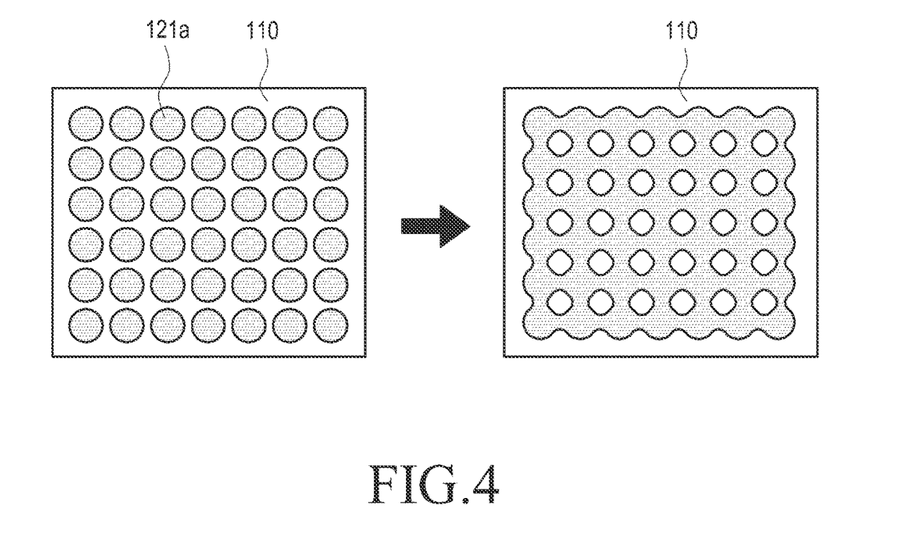
FIG. 4 illustrates formation of a Polymer Dispersed Liquid Crystal (PDLC) coating layer on a transparent substrate according to an embodiment of the present disclosure.

FIG. 3 is a sectional view of a transparent circuit substrate in a display device according to an embodiment of the present disclosure, and FIG. 4 illustrates formation of a PDLC coating layer on a transparent substrate according to an embodiment of the present disclosure.

Referring to FIGS. 3 and 4 (FIG. 5 may also be referred to), the transparent circuit substrate 300 may include a SUB 100 and a Touch Screen Panel (TSP) 200.

The SUB 100 may include a transparent substrate 110, a PDLC coating layer 120, an electrode layer 130, and an insulation layer 140. The transparent substrate 110 is formed of an insulation material transparent to visible light. The insulation material may be, for example, glass, PolyEthylene Terephthalate (PET), PolyCarbonate (PC), or the like. The TSP 200 is disposed on one surface of the transparent substrate 110, with the other surface of the transparent substrate 110 exposed outward.

The transparent substrate 110 may be divided into a Display Area (DA) at the center, including a valid display area displayed to a viewer and a Bezel Area (BA) that prevents outward exposure of a circuit unit (not shown) formed along the periphery of the DA or a peripheral part including a connection pattern 250 connecting the circuit unit to the TSP 200. Because the transparent substrate 110 is formed of an insulation material transparent to visible light, the BA may be rendered colored by the PDLC coating layer 120 provided on one surface of the transparent substrate 110, thus preventing outward exposure of the connection pattern 250 or the circuit unit.

The PDLC coating layer 120 is formed by spreading PDLCs on a tile surface of the transparent substrate 110 by inkjet printing or slit coating. The PDLC coating layer 120 is formed by curing the PDLCs spread on the transparent substrate 110.

The PDLC coating layer 120 is spread on the entirety of the DA and the BA of the transparent substrate 110. Therefore, when the tile surface of the transparent substrate 110 is exposed outward, the transparent substrate 110 may be rendered in various colors by means of the PDLC coating layer 120. That is, the PDLC coating layer 120 may render the DA as well as the BA colored. In addition, the colors of the BA and the DA may be realized separately depending on PDLCs spread on the transparent substrate 110. That is, the BA and the DA may be rendered in the same color or different colors. An aqueous solution of PDLC 121 a is spread on the entire surface of the transparent substrate 110 by inkjet printing or slit coating.

When the display device 10 is deactivated, the PDLC coating layer 120 spread on the transparent substrate 110 may render the whole transparent substrate 110 colored. With the display device 10 active, the orientation of PDLC polymers of the PDLC coating layer 120 is changed so that an image of the display unit 15 may be visible to a user through the transparent substrate 110. In the 'inactive state of the display device 10', main operation power is supplied and the TSP 200 or the display unit 15 of the display device 10 is turned off. Hence, the PDLC coating layer 120 renders the BA and the DA in predetermined colors. In the 'active state of the display device 10', the main operation power is supplied and the TSP 200 or the display unit 15 of the display device 10 is turned on. Hence, power is supplied to the PDLC coating layer 120, thereby rendering the BA in a predetermined color and turning the DA transparent. The electrode layer 130 is provided for the PDLC coating layer 120 to apply current to the PDLC coating layer 120. The insulation layer 140 may be provided to prevent current transfer or interference between the electrode layer 130 and the TSP 200. In an embodiment of the present disclosure, the electrode layer 130 is provided on the PDLC coating layer 120, by way of example. In addition, the insulation layer 140 is provided on the electrode layer 120 and the PDLC coating layer 120, by way of example. That is, the electrode layer 130 may be formed on the PDLC coating layer 120, and the insulation layer 140 may be formed on the electrode layer 130 and the PDLC coating layer 120. However, the stack structure of the electrode layer 130 or the insulation layer 140 and the PDLC coating layer 120 is not limited to the specific structure. That is, the electrode layer 130 may be formed on, under, or beside the PDLC coating layer 120 and the insulation layer 140 may be disposed at a position that enables prevention of interference or current transfer to the TSP 200 according to the position of the electrode layer 130. Accordingly, many modifications or variations may be made to the stack structure and/or positions of the electrode layer 130, the insulation layer 140, and the PDLC coating layer 120. With the display device 10 inactive, the DA should be rendered colored by irregular orientation of PDLC polymers, whereas with the display device 10 active, the DA should be rendered transparent so as to display an image on a screen. Therefore, the electrode layer 130 may be provided in such a manner that the electrode layer 130 may apply current to a DA part of the PDLC coating layer 120 formed on the whole surface of the transparent substrate 110.

As described above, when current flows in the PDLC coating layer 120, PDLC polymers of the PDLC coating layer 120 may render the transparent substrate 110 having the PDLC coating layer 120 formed thereon transparent by reordering transparent substrate 110's orientation and thus scattering light. The states of the PDLC polymers of the DA part and BA part of the PDLC coating layer 120 may change depending on the active or inactive state of the display device 10. When the display device 10 is activated, an area of the transparent substrate 110 corresponding to the DA part of the PDLC coating layer 120 may become a transparent window to display an image in the DA. An area of the transparent substrate 110 corresponding to the BA part of the PDLC coating layer 120 may become a shielding window that prevents outward exposure of the connection pattern 250 or the circuit unit. Therefore, current may flow in the DA part of the PDLC coating layer 120 by ordering the orientation of PDLC polymers and thus scattering light, so that the DA part of the PDLC coating layer 120 may become a transparent window, while current is blocked to the BA part of the PLDC coating layer 120 to keep the existing orientation of PDLC polymers irregular.

Therefore, the electrode layer 130 may be confined to the DA part of the PDLC coating layer 120, except the BA part of the PDLC coating layer 120.

Figure 6:
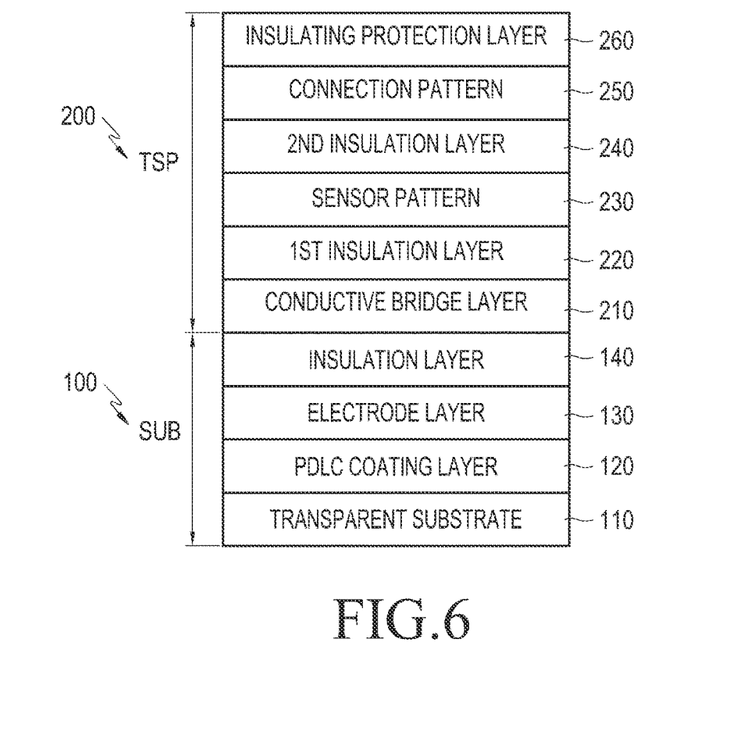
FIG. 6 is a stack diagram illustrating a transparent circuit substrate in a display according to an embodiment of the present disclosure.

In the above-described SUB 100, the transparent substrate 110, the PDLC coating layer 120, the electrode layer 130, and the insulation layer 140 are sequentially stacked in this order in the DA, whereas the transparent substrate 110, the PDLC coating layer 120, and the insulation layer 140 are sequentially stacked in this order in the BA (refer to FIGS. 3 and 6).

The electrode layer 130 may be formed in various manners. In an embodiment of the present disclosure, the electrode layer 130 may be formed by depositing a transparent conductor on the PDLC coating layer 120 and forming a circuit pattern by removing the transparent conductor. Herein, the transparent conductor may be removed entirely from the BA. For example, the transparent conductor deposited on the PDLC coating layer 120 may be removed from the BA and a part other than a circuit pattern on the PDLC coating layer 120 by etching.

As described before, with the PDLC coating layer 120 provided on the transparent substrate 110, no current is applied to the PDLC coating layer 120 and the PDLC coating layer 120 formed on the whole surface of the transparent substrate 110 may render the DA and the BA in the same color or different colors. If power is supplied to the electrode layer 130 and thus current is applied to the PDLC coating layer 120, the PDLC polymers of the BA part of the PDLC coating layer 120 keep their orientation, whereas the PDLC polymers of the DA part of the PDLC coating layer 120 are oriented. The BA part of the PDLC coating layer 120 may scatter light and the part of the transparent substrate 110 corresponding to the DA part of the PDLC coating layer 120 becomes a transparent window. Thus, an image generated from the display unit 15 may be displayed to the user through the transparent PDLC coating layer 120 and the transparent substrate 110. That is, since the electrode layer 130 applies current to the DA part of the PDLC coating layer 120 except the BA part of the PDLC coating layer 120 that should be kept colored, the polymers of the BA part of the PDLC coating layer 120 keep their existing orientation, thus rendering the BA colored, whereas the orientation of the polymers of the DA part of the PDLC coating layer 120 is changed and scatters light, thereby rendering the DA transparent and displaying an image of the display unit 15 in the DA.

While it has been described in the embodiment of the present disclosure that the electrode layer 130 is deposited on the PDLC coating layer 120 and the insulation layer 140 is coated on the electrode layer 130, formation of the electrode layer 130 and the insulation layer 140 is not limited to the specific method. For example, a film member (150 in FIG. 7) having the electrode layer 130 formed thereon to apply current to the PDLC coating layer 120 may be formed on the PDLC coating layer 120 (for example, by lamination). Thus, many modifications or variations may be made to the method for depositing or forming the electrode layer 130 and the insulation layer 140.

The TSP 200 may include conductive patterns such as Transmission (Tx) and Reception (Rx) patterns on one surface of the SUB 100 so as to sense touch on or proximity to the SUB 100. Specifically, the TSP 200 may include a conductive bridge layer 210, a first insulation layer 220, and a sensor pattern 230.

The sensor pattern 230 may include first conductive patterns (not shown) extended in a first direction (for example, in an X-axis direction) and second conductive patterns (not shown) extended in a second direction (for example, in a Y-axis direction). The first conductive patterns intersect with the second conductive patterns at a plurality of points on the SUB 100. The conductive bridge layer 210 electrically connects the second conductive patterns so that the second conductive patterns may not be disconnected at the intersections. The first insulation layer 220 insulates the first conductive patterns from the second conductive patterns at the intersections.

The conductive bridge layer 210 is formed by depositing a transparent conductive member of Indium Tin Oxide (ITO) or Poly (3,4-EthyleneDiOxyThiophene) (PEDOT) (hereinafter, referred to as a first transparent conductive member) on the SUB 100, specifically on the insulation layer 140 and partially patterning the first transparent conductive member into conductive strips at the intersections between the first and second conductive patterns of the sensor pattern 230.

The first insulation layer 220 is formed on the conductive bridge layer 210. The first insulation layer 220 may include a plurality of insulation strips. The plurality of insulation strips are formed on the conductive strips in a one-to-one correspondence so that the conductive strips intersect with their corresponding insulation strips (for example, like crosses).

The sensor pattern 230 is formed on the first insulation layer 220 covering the conductive bridge layer 210. Specifically, a transparent conductive member of ITO or PEDOR (hereinafter, referred to as a second transparent conductive member) is formed on an exposed surface of the SUB 100 and the first insulation layer 220. The second transparent conductive member is partially etched into predetermined patterns as the first and second conductive patterns.

A second insulation layer 240 (hereinafter, referred to as an insulation member 240) is formed on the SUB 100 having the sensor pattern 230 formed thereon. The insulation member 240 is formed on the sensor pattern 230 in such a manner that an end portion of the sensor pattern 230 may be exposed. Therefore, when the connection pattern 250 is formed in the BA, the sensor pattern 230 may be connected electrically to the connection pattern 250.

The connection pattern 250 is provided around the sensor pattern 230. The connection pattern 250 is formed along the periphery of the sensor pattern 230, that is, in the BA, overlapped with the end portion of the sensor pattern 230. The connection pattern 250 may be formed by forming a conductive member on the insulation member 240 from which the end portion of the sensor pattern 230 is exposed and etching the conductive member. However, the method for forming the connection pattern 250 or the structure of the connection pattern 250 is not limited to the specific one. As long as the connection pattern 250 is connected to the sensor pattern 230 and thus connects the sensor pattern 230 to the circuit unit, the formation method or structure of the connection pattern 250 may be modified or changed in various manners.

The connection pattern 250 may include connection ports for applying current to the sensor pattern 230 and connection lines for connecting the connection ports to the first and second conductive patterns. Since the connection pattern 250 is disposed in the BA, the connection pattern 250 is not visible. The connection pattern 250 is hidden by the color of the PDLC coating layer 120. Thus, the connection pattern 250 may be formed of the same material as the sensor pattern 230 or the conductive bridge layer 210 or a different material such as a non-transparent conductive material like silver. The insulating protection layer 260 is formed on an exposed top surface of the above-constituted transparent circuit substrate 300 for a touch screen.

The display device 10 is fabricated by attaching the above transparent circuit substrate 300 to the display unit 15 using the adhesive member 16 (see FIG. 2).

Because a display device has the above structure according to the embodiment of the present disclosure, there is no need for a printed layer in a BA and a DA as well as the BA may be rendered colored.

Now a description will be given of a method for fabricating the display device 10 having the above structure. A description of components, functions, structures, or the like in relation to the display device 10 in various embodiments of the present disclosure is pursuant to the above description and thus the following description is briefly given within a necessary range.

Figure 5:
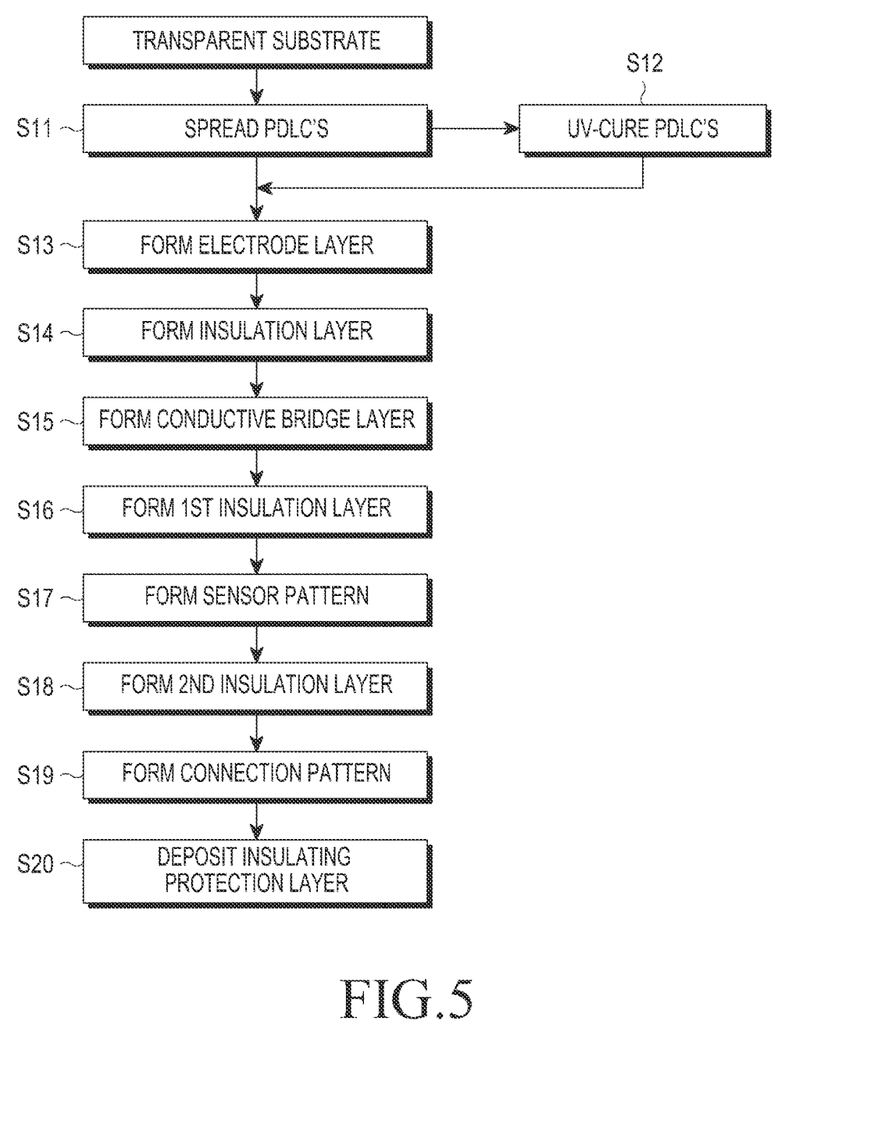
FIG. 5 is a flowchart illustrating a method for fabricating a display device according to an embodiment of the present disclosure.

FIG. 5 is a flowchart illustrating a method for fabricating a display device according to an embodiment of the present disclosure and FIG. 6 is a stack diagram illustrating a transparent circuit substrate in a display device according to an embodiment of the present disclosure.

Referring to FIGS. 5 and 6, a method for fabricating the display device 10 according to an embodiment of the present disclosure includes forming the transparent circuit substrate 300 for a touch screen and combining the transparent circuit substrate 300 with the display unit 15. The operation for forming the transparent circuit substrate 300 may include forming the SUB 100 and forming the TSP 200 on the SUB 100.

The operation for forming the SUB 100 may include forming the PDLC coating layer 120 on the transparent substrate 110 in operations S11 and S12, depositing the electrode layer 130 in operation S13, and forming the insulation layer 140 in operation S14.

The operation for forming the PDLC coating layer 120 on the transparent substrate 110 may include spreading PDLCs on the transparent substrate 110 in operation S11 and curing the PDLCs spread on the transparent substrate 110 in operation S12. An aqueous solution of PDLC 121a is spread on the entire surface of the transparent substrate 110 by inkjet printing or slit coating. The aqueous solution of PDLC 121a spread on the transparent substrate 110 is cured to PDLCs by UV light. In this manner, the PDLC coating layer 120 may be formed on the transparent substrate 110.

After the PDLC coating layer 120 is formed on the transparent substrate 110, the electrode layer 130 and the insulation layer 140 are formed in operations S13 and S14. The electrode layer 130 may be formed to apply current to the part of the PDLC coating layer 120 spread in the DA of the transparent substrate 110 and thus change the orientation of PDLC polymers in the DA part of the PDLC coating layer 120. An insulator may be formed on the electrode layer 130.

The electrode layer 130 may be formed by depositing a transparent conductor on the transparent substrate 110 having the PDLC coating layer 120 formed thereon and etching the deposited transparent conductor.

That is, the transparent conductor is deposited on the transparent substrate 110 having the PDLC coating layer 120 formed thereon. The transparent conductor deposited on the entire surface of the PDLC coating layer 120 may be etched in such a manner that the transparent conductor is removed from the BA, except the DA and thus applies current to the DA part of the PDLC coating layer 120. The PDLC coating layer 120 is exposed outward in the BA and the electrode layer 130 is deposited on the DA part of the PDLC coating layer 120. Therefore, before the electrode layer 130 is turned on, the PDLC coating layer 120 is rendered in the same color or different colors according to the spread PDLCs, in the DA and the BA. When the electrode layer 120 is turned on, the polymers of the DA part of the PDLC coating layer 120 are reordered, thus turning the DA part of the PDLC coating layer 120 into a transparent window so that an image of the display unit 15 may be displayed. The insulation layer 140 is formed on the transparent substrate 110 having the above structure in operation S14. The insulation layer 140 functions to restrict current transfer between the sensor pattern 230 of the later-formed TSP 200 and the electrode layer 130. Accordingly, after the electrode layer 130 is formed, the insulation layer 140 covers the exposed PDLC coating layer 120 and the electrode layer 130 (see FIGS. 2 and 3).

The TSP 200 is formed on the above-described SUB 100 in operations 15 through 20. The operation for forming the TSP 200 includes forming the conductive bridge layer 210 in operation S15, forming the first insulation layer 220 in operation S16, forming the sensor pattern 230 in operation S17, forming the second insulation layer 240 (i.e., the insulation member 240) in operation S18, forming the connection pattern 250 in operation S19, and forming the insulating protection layer 260 in operation S20.

Specifically, the conductive bridge layer 210 may first be formed on the SUB 100 formed in operations S11 through S14 in order to form the sensor pattern 230 having first and second conductive patterns intersecting with each other, in operation S15.

The operation for forming the conductive bridge layer 210 may include deposition and etching of the first transparent conductive member. First, the first transparent conductive member of ITO, PEDOT, or the like is deposited on the insulation layer 140 of the SUB 100 and etched into conductive strips in a predetermined pattern. Thus, the conductive bridge layer 210 is formed on the insulation layer 140 of the SUB 100. The conductive strips are formed at the intersections of the sensor pattern 230, thereby electrically connecting the sensor pattern 230.

The first insulation layer 220 is formed on the conductive bridge layer 210 in operation S16. The first insulation layer 220 is formed on the SUB 100 having the conductive bridge layer 210 formed thereon. The first insulation layer 220 is formed into a plurality of insulation strips or is first deposited on the entire surface of the conductive bridge layer 210 and etched into the plurality of insulation strips. The insulation strips are disposed on the conductive strips in a one-to-one correspondence, intersecting with the conductive strips.

The sensor pattern 130 is formed on the SUB 100 having the conductive bridge layer 210 formed thereon in operation S17. The operation for forming the sensor pattern 230 may include deposition and etching of the second transparent conductive member. That is, the second transparent conductive member of ITO, PEDOT, or the like is deposited on the first insulation layer 220 covering the conductive bridge layer 210 and partially etched into predetermined first and second conductive patterns.

The insulation member 240 is provided on the SUB 100 having the sensor pattern 230 formed thereon in operation S18. While not shown, the operation for forming the insulation member 240 may include formation and etching of an insulator. The insulation member 240 may cover the sensor pattern 230, except for an end portion of the sensor pattern 230. Thus, the insulator may be spread on the SUB 100 having the sensor pattern 230 formed thereon and the insulation member 240 may be formed by etching the insulator only around the sensor pattern 230 so as to expose an end portion of the sensor pattern 230. However, the operation for forming the insulation member 240 is not limited to the specific operation. It may be further contemplated that the insulation member 240 is formed by providing an insulator that exposes an end portion of the sensor pattern 230.

The connection pattern 250 is formed on the SUB 100 having the insulation member 240 formed thereon in operation S19. While not shown, the operation for forming the connection pattern 250 may include deposition and etching of a conductive member. That is, after the conductive member is deposited on the SUB 100, the connection pattern 250 may be formed by etching the conductive member except for a position corresponding to the connection pattern 250.

The insulating protection layer 260 is formed on the SUB 100 having the connection pattern 250 formed thereon in operation S20. Thus, the transparent circuit substrate 300 is completely formed. The display device 10 may be finished by combining the transparent circuit substrate 300 with the display unit 15 by means of the adhesive member 16.

Figure 7:
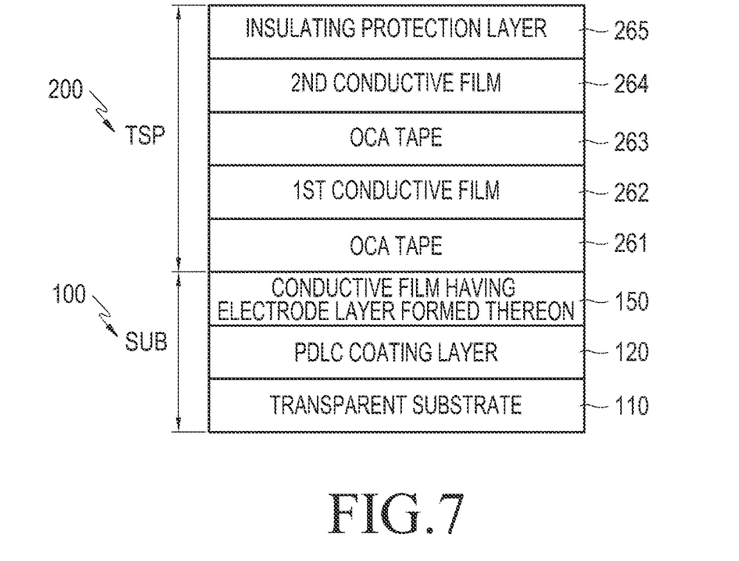
FIG. 7 illustrates a display device according to according to another of embodiment of the present disclosure.
Figure 8:
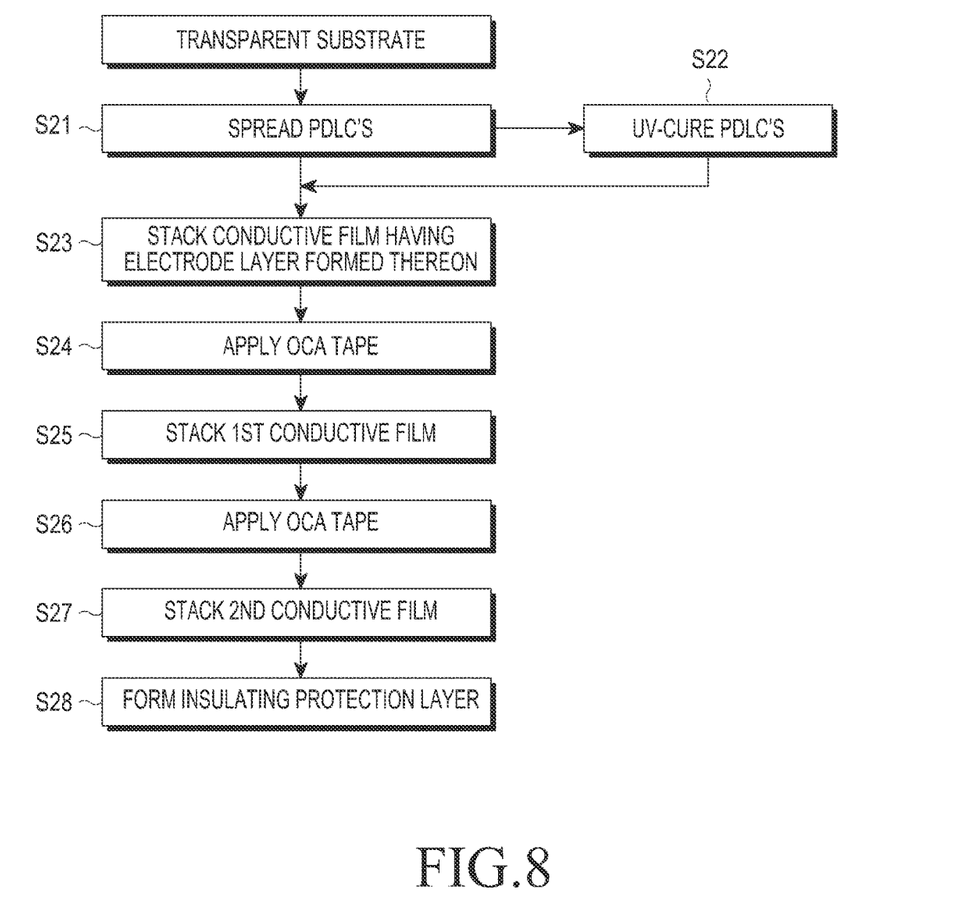
FIG. 8 is a flowchart illustrating a method for fabricating a display device according to according to another of embodiment of the present disclosure.

FIG. 7 illustrates a display device according to another embodiment of the present disclosure, and FIG. 8 is a flowchart illustrating a method for fabricating a display device according to another embodiment of the present disclosure.

Referring to FIGS. 7 and 8, the SUB 100 has a similar structure and composition to those of the SUB 100 according to the afore-described embodiment of the present disclosure, except for the TSP 200. Accordingly, the same components or the same structures may be pursuant to the above description.

That is, the display device 10 according to this embodiment of the present disclosure is also provided with the TSP 200 on the transparent substrate 110 having the PDLC coating layer 120 formed thereon. The TSP 200 may be formed by forming conductive films having Tx and Rx patterns formed thereon in the various embodiments of the present disclosure.

Specifically, the electrode layer 130 and the insulation layer 140 are provided on the transparent substrate 110 having the PDLC coating layer 120 formed thereon. The electrode layer 130 and the insulation layer 140 may be formed in the afore-described manner or a conductive film having the electrode layer 130 formed thereon may be provided separately in this embodiment of the present disclosure. In the embodiment of the present disclosure, the PDLC coating layer 120 is deposited on the transparent substrate 110 and the conductive film 150 having the electrode layer 130 and the insulation layer 140 formed thereon is provided on the PDLC coating layer 120 in the SUB 100 in operations S21, S22, and S23.

The transparent substrate 110, the PDLC coating layer 120, and the conductive film 150 are sequentially stacked in the SUB 100. As in the afore-described embodiment of the present disclosure, the conductive film 150 may restrict application of current to the BA, while applying current to the PDLC coating layer 120 in the DA.

A first conductive film 262 and a second conductive film 264 are sequentially formed on the transparent substrate 110 having the conductive film 150 formed thereon, for formation of the sensor pattern 230. The conductive film 150, the first conductive film 262, and the second conductive film 264 may be combined by interposing OCA tapes 261 and 263 transparent to visible light in operations S24, S25, S26 and S27. The connection pattern 250 may be provided on the first and second conductive films 262 and 264 in such a manner that an end portion of the sensor pattern 230 may be connected to the circuit unit. Or a conductive film having the connection pattern 250 may be formed separately. The insulating protective layer 265 is formed in operation S28.

The display device 10 according to the embodiment of the present disclosure may also render the DA and the BA in the same color or in different colors through the PDLC coating layer 120, in an inactive state (see FIGS. 2 and 3). In an active state, the BA may be kept in the color rendered by the PDLC coating layer 120 and the DA may turn into a transparent window by applying current to the PDLC coating layer 120 of the SUB 100 and thus scattering light. Thus, an image generated in the display device 15 may be displayed in the DA through the SUB 100 being a transparent window.

As is apparent from the foregoing description, the display device and the method for fabricating the same according to various embodiments of the present disclosure may render a DA as well as a BA colored. The DA and the BA may be rendered in the same color or different colors depending on diffraction of light incident on a transparent substrate having a PDLC coating layer formed thereon. Therefore, a screen of the display device may be rendered in various colors.

Furthermore, a whole screen may be uniformly colored, thereby enhancing the appearance of the display device. The screen may also be rendered in various colors, diversifying the design of the display device.

While the present disclosure has been shown and described with reference to certain various embodiments thereof, it will be understood by those skilled in the art that various changes in form and details may be made therein without departing from the spirit and scope of the disclosure as defined by the appended claims and their equivalents.

What is claimed is:

1. A display device comprising:
   a transparent circuit substrate for use as a touch screen, the transparent circuit substrate including a display area and a non-display area provided along a periphery of the display area,
   wherein the transparent circuit substrate comprises a substrate unit and a touch unit disposed on the substrate unit,
   wherein the touch unit comprises:
      a first insulation layer;
      a first conductive pattern and a second conductive pattern provided on the display area that intersect with each other with the first insulation layer in between; and
      a connection pattern provided on the non-display area and electrically connected to the first conductive pattern and the second conductive pattern,
   wherein the substrate unit comprises:
      a transparent substrate;
      a polymer dispersed liquid crystal (PDLC) coating layer including a first area corresponding to the display area and a second area corresponding to the non-display area;
      an electrode layer provided on the first area of the PDLC coating layer, for applying current to the first area of the PDLC coating layer; and
      an insulation layer provided on the electrode layer,
   wherein the PDLC coating layer, the electrode layer and the insulation layer are disposed between the transparent substrate and the touch unit,
   wherein, when the current is applied to the electrode layer, the first area of the PDLC coating layer corresponding to the display area is rendered transparent, the second area of the PDLC coating layer corresponding to the non-display area is rendered in a predetermined color, and an image output by a display unit is visible through the first area of the PDLC coating layer, and
   wherein, when the current is not applied to the PDLC coating layer, the first area of the PDLC coating layer corresponding to the display area and the second area of the PDLC coating layer corresponding to the non-display area are rendered in the predetermined color.

2. The display device of claim 1, wherein the PDLC coating layer is formed by spreading PDLCs on the transparent substrate.

3. The display device of claim 2, wherein the PDLC coating layer is formed by curing the PDLCs spread on the transparent substrate.

4. The display device of claim 2,
   wherein the transparent circuit substrate is divided into the display area on which a touch panel is provided and the non-display area is disposed around the display area, and
   wherein the PDLC coating layer renders colors of the display area and the non-display area separately.

5. The display device of claim 4, wherein the electrode layer is formed by depositing a transparent conductor on the PDLC coating layer and patterning the transparent conductor into a circuit pattern in a touch area.

6. The display device of claim 2, wherein the touch unit further comprises:
   a conductive bridge layer formed on the insulation layer;
   the first insulation layer formed on the transparent substrate and the conductive bridge layer; and
   a sensor pattern having the first conductive pattern and the second conductive pattern.

7. The display device of claim 2,
   wherein the electrode layer is deposited on the PDLC coating layer, and
   wherein the insulation layer is coated on the PDLC coating layer and the electrode layer.

8. The display device of claim 2,
   wherein the electrode layer and the insulation layer are provided in a film unit, and
   wherein the film unit is formed on the PDLC coating layer.

9. The display device of claim 1, wherein, when current is applied to the electrode layer, the PDLC coating layer is rendered transparent by changing a polymer orientation of the PDLC coating layer and scattering light.

\* \* \* \* \*